Feb. 7, 1956  L. E. PLATT  2,733,947
PAN HANDLE
Filed March 24, 1952
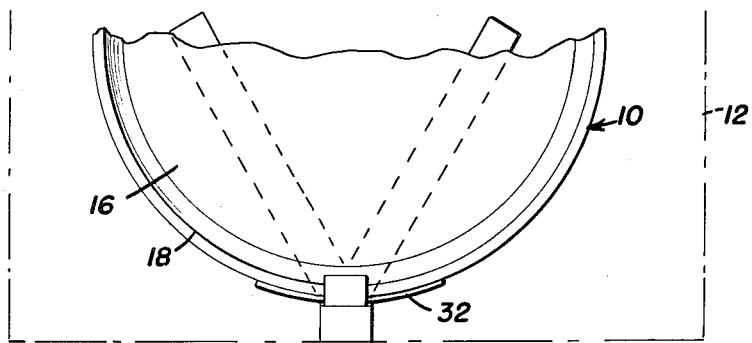
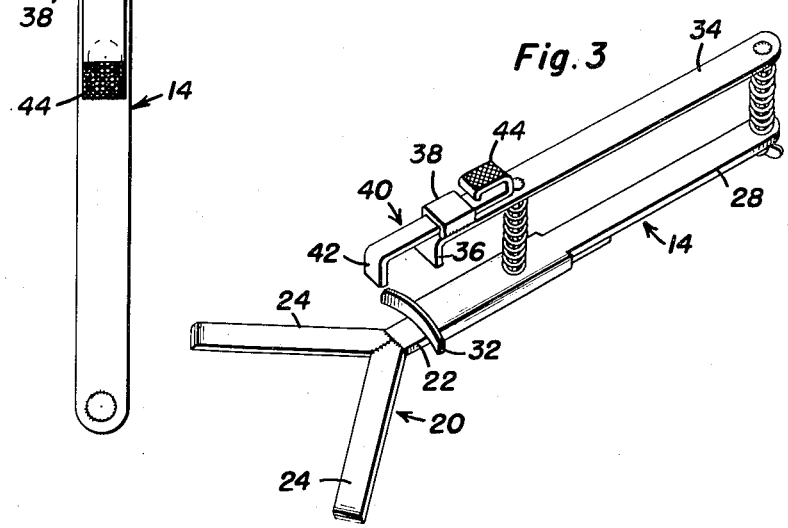
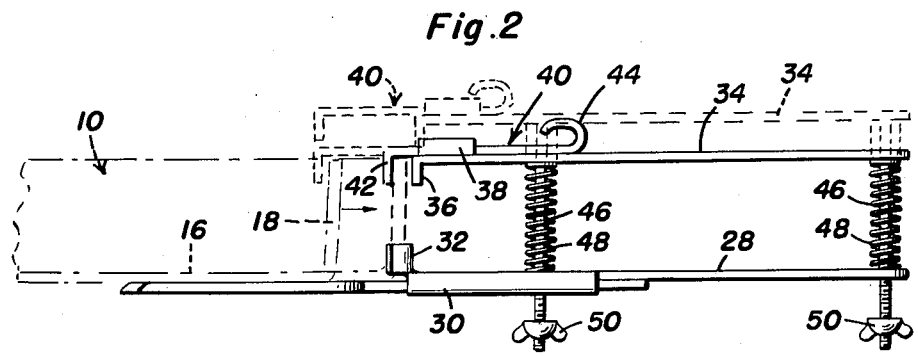
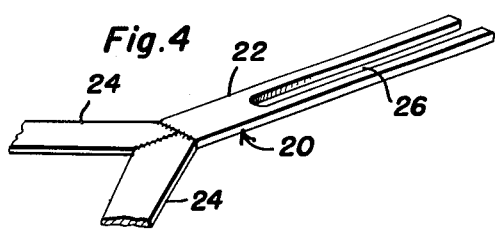
Lavinia Elizabeth Platt
INVENTOR.

United States Patent Office 2,733,947
Patented Feb. 7, 1956

2,733,947

PAN HANDLE

Lavinia Elizabeth Platt, Akron, Ohio

Application March 24, 1952, Serial No. 278,172

3 Claims. (Cl. 294—34)

This invention relates in general to a pan handle, and more specifically to a pan handle for grasping hot pans whereby they may be removed from ovens or stoves.

In common usage throughout the country there are a great number of pans, such as bread pans, which have no handles in order that they may be conveniently gripped when hot. In order to grasp these pans when hot, it is necessary to either wear gloves or utilize a dish towel in the manner well known to the average housekeeper. However, in directly grasping the pan there is a possibility of one burning themselves and in cases where the pan is filled with a hot liquid, any rearward spilling of the liquid will result in the burning of the hand of the person who is removing the pan from a hot surface.

The primary object of this invention is to provide an improved pan handle which may be utilized to securely grip a pan for removing same from a hot surface.

Another object of this invention is to provide an improved pan handle for detachable connection to a conventional handleless pan, said pan handle having spaced parallel grip portions which are adapted to be moved towards each other while maintaining their parallel relation so as to prevent a tilting force on a pan being removed by said pan handle.

Another object of this invention is to provide an improved pan handle having a portion adapted to engage the bottom of a pan, said portion being adjustable with respect to its associated gripping portion whereby it may be adjusted to fit the pan adapted to be engaged thereby.

Another object of this invention is to provide an improved pan handle for detachably gripping pans, said pan handle including a gripping portion having a fixed flange thereon, a movable portion having a flange adapted to engage the innerside of the rim of the pan whereby the rim of the pan may be gripped between the fixed flange and the movable flange.

Another object of this invention is to provide an improved pan handle for grasping pans, said pan handle being of a simple construction which may be economically manufactured.

Another object of this invention is to provide spring means between adjacent grip portions whereby said grip portions are maintained in a spaced parallel relation.

A further object of this invention is to provide an improved pan handle having spaced apart parallel grip portions, one of said grip portions having guide means thereon for maintaining said grip portions in a parallel relation, means carried by said guides for limting the space between the grip portions.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a top plan view showing a pan being removed from an oven by the pan handle which is the subject of this invention, portions of the pan being broken away so as to illustrate the relationship of the pan handle with respect to the pan, the oven being depicted by broken lines;

Figure 2 is a side elevational view of the pan handle of Figure 1 showing same in engagement with a pan, said pan being illustrated by dotted lines, and showing the details of the construction of the pan handle, various stages of the pan handle being shown in dotted lines as it is moved into pan engaging position;

Figure 3 is a perspective view of the pan handle of Figures 1 and 2 and showing the relationship of the various elements of the pan handle; and Figure 4 is a partial enlarged perspective view of one of the pan engaging portions of the pan handle.

Similar characters of reference designate similar or identical elements and portions throughout the specification and throughout the different views of the drawings.

Referring now to the drawings in detail, it will be seen that illustrated in Figure 1 is a pan 10 being removed from an oven 12 by the pan handle 14 which is the subject of this invention.

It will be seen that the pan 10 has a bottom 16 and a peripheral rim 18. The pan handle 14 is provided with a first pan engaging portion 20 which is adapted to underlie the bottom 16 of the pan 10. The first pan engaging portion 20 is generally Y-shaped and has a leg 22 and a pair of diverging arms 24. As is best illustrated in Figure 4, the leg 22 has an elongated central slot 26 which is open at the free end of the leg. The purpose of the elongated slot 26 will be explained in more detail hereinafter.

Associated with the first pan engaging portion 20 is a first grip portion 28 which has at one end downwardly and inwardly turned flanges 30 to form a guideway in which is slidably received the leg 22 of the first pan engaging portion 20. Said one end of the first grip portion 28 is also provided on its upper side with a curved pan engaging flange 32. As is best illustrated in Figure 2, the curved pan engaging flange 32 is adapted to engage the rim 18 of the pan 10 adjacent its intersection with the bottom 16.

In spaced parallel relation to the first grip portion 28 is a second grip portion 34. The second grip portion 34 has a downwardly directed flange 36 at one end thereof in substantially overlapping relationship to the pan engaging flange 32. Secured to the upper side of said one end of the grip portion 34 is a downwardly directed channel 38 which together with the upper surface of the second grip portion 34 forms a guideway.

Slidably mounted in the guideway formed by the channel 38 is a second pan engaging portion 40. The second pan engaging portion 40 has at its forward end a downturned flange 42 for engaging behind the inner surface of the rim 18 of the pan 10. The second pan engaging portion 40 also has an upwardly and reversely turned flange portion 44 which has a knurled upper surface whereby the second pan engaging portion 40 may be moved longitudinally of the second grip portion 34 by pressure exerted thereon by the thumb of a person holding the handle 14.

It will be noted that the second grip portion 34 overlies the first grip portion 28 and is provided with a pair of spaced guides 46 extending downwardly from its underside. The guides 46 are in the form of threaded bolts which extend through apertures in the first grip portion 28. Mounted on the guides 46 are coil springs 48 which engage the undersurface of the second grip portion 34 and the upper surface of the first grip portion 28. In order that the spacing between the first and second grip portions be limited, there are threadedly engaged on the guides 46 adjustable stop members 50 in the form of conventional wing nuts. When the pan handle is being used with a plurality of pans 10 of the same size, the stops 50 are adjusted so that the flange 42 just clears the upper edge of the rim 18 of the pan 10 when the first pan engaging portion 28 is in engagement under the bottom 16 of the pan.

As is best illustrated in Figures 3 and 4, the arms 24 of the first pan engaging portion 20 are illustrated as being separate elements from each other and the leg 22. However, if it is so desired the entire portion may be formed of a single sheet of metal. The free ends of the arms 24 are rounded in order to facilitate engagement of the arms under the bottom of a pan. Since one of the guides 46 passes through the guideway formed by the downwardly and inturned flanges 30 of the first grip portion 28, it is obvious that the guide 46 will also have to pass through the leg 22 of the first pan engaging portion disposed within the guideway. Due to the provision of the elongated slot 26 in the leg 22, it is obvious that the first pan engaging portion 20 is free to slide in the guideway of the first grip portion 28 without hindrance from the guide 46.

Referring now to Figure 3 in particular, it will be seen that the pan engaging portion 20 is first led under the bottom 16 of a pan 10 with the second pan engaging portion 40 in its extended position. The first pan engaging portion 20 is moved under the pan 10 until its rim 18 engages the curved flange portion 32. The second grip portion 34 is then squeezed towards the first grip portion 28 by the hand of the operator holding the pan handle 14. This results in the flange 42 engaging behind the rim 18 of the pan 10. After the flange 42 has been engaged behind the upper portion of the rim 18 of the pan 10, the second pan engaging portion 40 is moved to the right, as viewed in Figure 2, until the upper portion of the rim 18 is firmly gripped between the flange 42 and the flange 36. While the second grip portion 34 is being continuously urged toward the first grip portion 28, the pan is removed from an oven or any other hot surface as if the pan handle 14 were permanently attached to the pan 10. When it is desired to release the pan 10 from the pan handle 14, the second grip portion 34 is allowed to move upwardly due to the urging of the springs 48 to a position where the flange 42 clears the upper edge of the rim 18. The pan handle 14 is then removed by sliding same to the right, as viewed in Figure 2.

The operation of this pan handle will be understood from the foregoing description of the mechanical details thereof, taken in connection with the above recited objects and the drawings. Further description would appear to be unnecessary.

Minor modification of the pan handle, varying in minor details from the embodiment of the pan handle illustrated and as described here, may be resorted to without departure from the spirit and scope of this invention, as defined in the appended claims.

Having described the invention, what is claimed as new is:

1. A detachable handle for handling a hot pan, said handle comprising a first portion adapted for insertion under a pan, a second portion for insertion over the rim of a pan, said first and second portions having grip portions connected together in vertically spaced parallel relation, means carried by said grip portions retaining said grip portions in parallel relation, said second pan engaging portion having a downturned flange in spaced parallel relation to a downturned flange integral with the grip portion associated with said second pan engaging portion, said second pan engaging portion being slidably carried by its associated grip portion for longitudinal movement whereby the rim of a pan may be gripped between said downturned flanges, said first pan engaging portion being slidably carried by its associated grip portion whereby pans of various sizes may be accommodated.

2. A detachable handle for handling a hot pan, said handle comprising a first portion adapted for insertion under a pan, a second portion for insertion over the rim of a pan, said first and second portions having grip portions connected together in vertically spaced parallel relation, means carried by said grip portions retaining said grip portions in parallel relation, said second pan engaging portion having a downturned flange in spaced parallel relation to a downturned flange integral with the grip portion associated with said second pan engaging portion, said second pan engaging portion being slidably carried by its associated grip portion whereby the rim of a pan may be gripped between said downturned flanges, a lower pan engaging flange projecting upwardly from the other grip portion the downturned flange of the grip portion being vertically aligned with said pan engaging flange.

3. A detachable handle for handling a hot pan, said handle comprising a first portion adapted for insertion under a pan, a second portion for insertion over the rim of a pan, said first and second portions having grip portions in vertically spaced parallel relation, said second pan engaging portion having a downturned flange in spaced parallel relation to a downturned flange integral with the grip portion associated with said second pan engaging portion, said second pan engaging portion being slidably carried by its associated grip portion whereby the rim of a pan may be gripped between said downturned flanges, a lower pan engaging flange projecting upwardly from the other grip portion, said grip portions being urged apart by a plurality of spaced springs, said spaced spring being mounted on guides carried by one of said grip portions whereby said grip portions are maintained in spaced parallel relation, said guides being provided with adjustable stop means limiting the maximum spacing of said grip portions.

References Cited in the file of this patent

UNITED STATES PATENTS

| | | |
|---|---|---|
| 389,925 | Griscom | Sept. 25, 1888 |
| 559,877 | Volkenrath | May 12, 1896 |
| 587,701 | Carlson | Aug. 10, 1897 |
| 906,801 | Hickey | Dec. 15, 1908 |
| 906,986 | Anderson | Dec. 15, 1908 |
| 916,524 | Auger | Mar. 30, 1909 |
| 949,573 | Henry | Feb. 15, 1910 |
| 950,189 | Ray | Feb. 22, 1910 |
| 1,246,491 | Thayer | Nov. 13, 1917 |
| 1,541,738 | Peyton | June 9, 1925 |
| 1,976,977 | Zinky | Oct. 16, 1934 |
| 2,228,547 | Whitehead | Jan. 14, 1941 |
| 2,333,564 | Hargrave | Nov. 2, 1943 |
| 2,334,252 | Darling | Nov. 16, 1943 |
| 2,396,479 | Votaw | Mar. 12, 1946 |
| 2,559,190 | Hallstream | July 3, 1951 |

FOREIGN PATENTS

| | | |
|---|---|---|
| 6,593 | Great Britain | Mar. 29, 1901 |
| 234,421 | Great Britain | May 28, 1925 |